April 7, 1931.  B. DARROW  1,800,179
REENFORCED WEB
Filed Feb. 6 1928
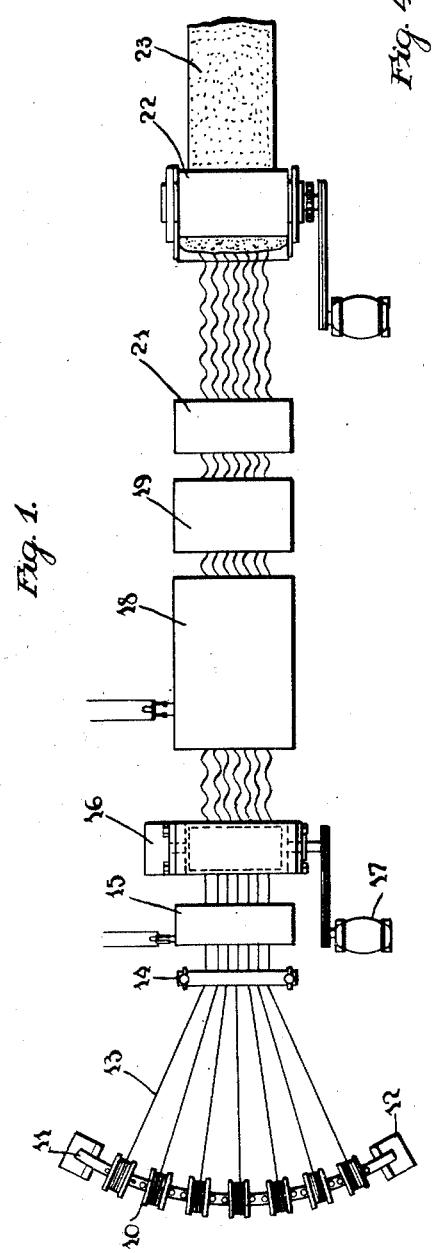
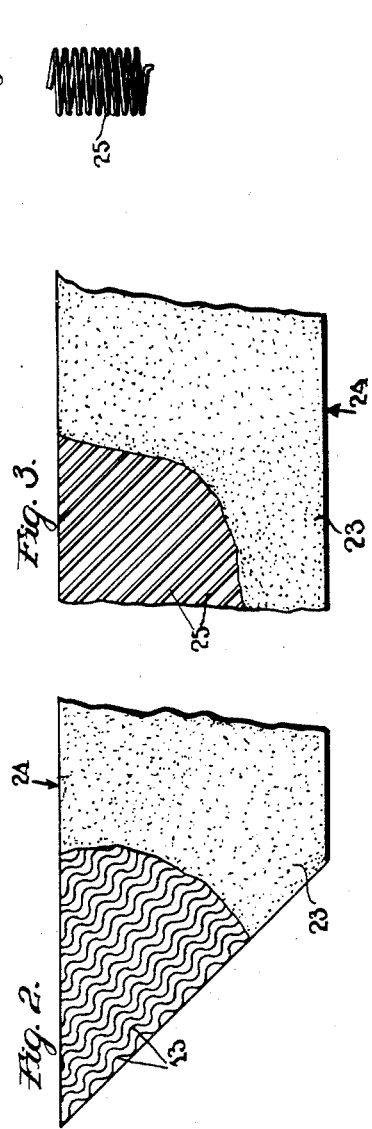
INVENTOR
*Burgess Darrow.*
BY
ATTORNEY Patented Apr. 7, 1931

1,800,179

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

REENFORCED WEB

Application filed February 6, 1928. Serial No. 252,144.

This invention relates to reenforced fabric and it has particular relation to a reenforced web adapted for use in the manufacture of pneumatic tire casings.

More than half of the pneumatic tire casings now constructed are formed of superimposed plies of cord fabric, which are composed of parallel cotton cords embedded in plastic material. Although such tires are much more serviceable than the tires in which cross-woven fabric is employed, they are not entirely satisfactory. For example, the failure of cotton cord is often due to friction between the fibers or strands, and the tendency of such failure increases very rapidly as the tension in the cord is increased. After the stress in a cotton cord reaches the value necessary to submit the cord to half of its normal breaking tension, the deterioration of the cord is very rapid.

A cotton cord is also subject to high elongation at low stresses, which is an undesirable characteristic in a tire fabric, although a considerable ultimate elongation is desirable. The durability of a cord fabric involving textile cord elements is also affected adversely by a rise in temperature such as that which occurs in tires when traveling at high speed. Fabric employing metallic filaments in lieu of fibrous cords is not adversely affected by such a rise in temperature.

It has been proposed to overcome certain of the difficulties above-mentioned by the utilization of metal reenforcing elements in the plies of the tire. For example, it has been proposed to employ a stranded metal cable as a reenforcing element in a tire fabric, but this construction is not entirely satisfactory by reason of the very low stress characteristic of such a cable.

An essential object of this invention is to provide a reenforced web so constructed as to overcome all of the objectionable features above noted that are inherent in tires involving textile cords and at the same time to provide a web which is less expensive and more durable.

For a better understanding of the invention, reference may now be had to the accompanying drawing forming a part of the disclosure, in which;

Figure 1 is a diagrammatical plan view illustrating an apparatus designed to practice the method and to produce the article constituting the subject matter of the invention;

Figure 2 is a fragmentary plan view illustrating the product resulting from a practice of the method, a portion of the plastic material being broken away to disclose the arrangement of the crimped wire elements;

Figure 3 is a similar view of a section of the product embodying coiled spring filaments; and Figure 4 is a fragmentary elevational view, on a larger scale, of a portion of one of the coiled spring elements.

In the apparatus shown, for illustrative purposes, in the accompanying drawing, a plurality of reels 10 are rotatably mounted in spaced relation upon a curved rod 11 removably positioned upon brakets 12. Metallic filaments 13 are conducted from the individual reels 10 through a spacing device 14 and through a heater 15 by means of a crimping device 16 adapted to be manually operated by means of a handle 17. The filaments 13 acquire a sufficient degree of heat in passage through the heater 15 to permit crimping thereof by the device 16. They are then fed in turn through a second heating device 18, a quenching device 19 and an annealing device 21, which act progressively upon the elements 13 properly to temper them. The tempering steps may be performed in a vacuum if desired by inclosing the devices 18, 19 and 21 within suitable fluid-tight means (not shown) from which the fluid may be exhausted.

From the annealer 21 the crimped filaments 13 are directed in spaced parallel relation to a calender 22 which serves to apply a plastic coating 23 to both sides of and between the filaments. The crimping and calendering devices may, of course, be power driven at the proper relative speeds, if desired. In any event they serve to transport the filaments 13 from the supply reels 10 into action thereon by the several devices above described to produce a continuous sheet or web of tire material 24.

It is proposed that the material 24 thus produced be handled and utilized in exactly the same manner in which cotton cord fabric is now utilized; that is, it may be fed to a bias cutter and be built into bands for tires by any of the methods known in the tire building art.

The invention also contemplates employing fine spiral spring elements 25 instead of the crimped filaments 13. The same method of procedure as that described above may be followed when springs are utilized in lieu of the filaments 13, with the exception that the crimping device 16 need not be employed. It may also be that tempered spring material of the required characteristics for use as filaments of the web may be obtained as a commercial article. In such event the same apparatus would be employed, with the exception that the devices 15 to 21, inclusive, would be omitted. That is, the spring material 25 would be fed from the reels 10 through the spacing device 14 and thence directly to the calender 22 for application of the friction material thereto.

Attention is directed to the fact that a spiral spring is, in reality, a curved or crimped filament and when it is incorporated as a reenforcing filament in a web, it has substantially the same characteristics as the crimped filaments 13. Inasmuch as the method of procedure is practically the same when the coiled spring material 25 is employed in lieu of the crimped filaments 13, it has been deemed unnecessary to separately illustrate the apparatus involving the coiled spring construction.

From the foregoing description it will be apparent that a novel method of constructing a reenforced web has been provided whereby the product obtained is more durable than cotton cord fabric and is not affected adversely by temperatures generated in a tire during use.

Although I have illustrated only the preferred forms which my invention may assume and have described in detail only two practical applications thereof, it will be apparent to those skilled in the art that the invention is not so limited, but that various minor modifications may be made therein without departing from the spirit of the invention or from the scope of the appended claim.

What I claim is:

A tire web comprising crimped metallic filaments maintained in spaced parallel relation and directed in the plane of the web by plastic material applied thereto.

In witness whereof, I have hereunto signed my name.

Signed at Akron, in the county of Summit and State of Ohio, U. S. A., this 4th day of February, 1928.

BURGESS DARROW.